(12) United States Patent
Peters et al.

(10) Patent No.: US 11,539,444 B2
(45) Date of Patent: Dec. 27, 2022

(54) PHASE MODULATOR FOR OPTICAL SIGNAL USING MULTIMODE INTERFERENCE COUPLERS

(71) Applicant: UNIVERSITY COLLEGE CORK—NATIONAL UNIVERSITY OF IRELAND, CORK, Cork (IE)

(72) Inventors: Frank Peters, Cork (IE); Shane Duggan, Cork (IE)

(73) Assignee: University College Cork—National University Of Ireland, Cork, Cork (IE)

(*) Notice: Subject to any disclaimer, the term of this patent is extended or adjusted under 35 U.S.C. 154(b) by 0 days.

(21) Appl. No.: 17/260,538

(22) PCT Filed: Jul. 17, 2019

(86) PCT No.: PCT/EP2019/069300
§ 371 (c)(1),
(2) Date: Jan. 14, 2021

(87) PCT Pub. No.: WO2020/016328
PCT Pub. Date: Jan. 23, 2020

(65) Prior Publication Data
US 2021/0328683 A1    Oct. 21, 2021

(30) Foreign Application Priority Data
Jul. 17, 2018   (GB) ...................................... 1811707

(51) Int. Cl.
*H04B 10/54*      (2013.01)
*H04B 10/548*     (2013.01)

(52) U.S. Cl.
CPC ................................ *H04B 10/548* (2013.01)

(58) Field of Classification Search
CPC .............. H04B 10/548; H04B 10/5053; H04B 10/5561; H04B 10/505; G02F 1/217; G02F 1/21; G02F 1/225
See application file for complete search history.

(56) References Cited

U.S. PATENT DOCUMENTS 5,117,471 A  *  5/1992  Furstenau ............... G02F 3/022
                                                     372/38.07
5,862,279 A  *  1/1999  Amersfoort .......... G02B 6/2813
                                                        385/27
(Continued)

FOREIGN PATENT DOCUMENTS

EP            2908449 A1       8/2015

OTHER PUBLICATIONS

Chang et al, "Differential Microring Modulators for Intensity and Phase Modulation: Theory and Experiments" Aug. 2017, Journal of Lightwave Technology, vol. 35, No. 15, pp. 3116-6124 (Year: 2017).*

(Continued)

*Primary Examiner* — Tanya T Motsinger
(74) *Attorney, Agent, or Firm* — Loza & Loza, LLP; Anthony Smyth (57) ABSTRACT

The invention provides an optical system and method for outputting a modulated signal comprising a single multimode interference (MMI) device having at least two inputs configured with a fixed phase and an output, wherein the output modulated signal is controlled by modulating the input power of at 5 least one of the inputs. The invention only requires a single MMI device to operate as the relative phase between the two inputs are fixed relative each other and one of the inputs can be used to modulate the output by modulating the power at a single input. In further embodiments, the invention shows how correct phases can be set by a single MMI device. Thus, no more than two 10 MMIs are (Continued)

required in conjunction with phase or amplitude modulating elements to fully generate a BPSK or QPSK signal.

13 Claims, 4 Drawing Sheets

(56) References Cited

U.S. PATENT DOCUMENTS

| | | | | |
|---|---|---|---|---|
| 6,253,000 | B1* | 6/2001 | Madsen | H04Q 11/0001 385/24 |
| 6,473,541 | B1* | 10/2002 | Ho | G02B 6/1225 385/50 |
| 6,798,557 | B1* | 9/2004 | Leven | H04L 27/2096 359/279 |
| 8,792,791 | B2* | 7/2014 | Wiseman | H04L 9/0852 398/186 |
| 9,298,024 | B2* | 3/2016 | Yamanaka | G02F 1/225 |
| 9,618,821 | B2* | 4/2017 | Jewart | G02F 1/225 |
| 10,244,297 | B1* | 3/2019 | Roth | G02B 6/3588 |
| 11,258,306 | B2* | 2/2022 | Chen | H02M 7/537 |
| 2003/0189744 | A1* | 10/2003 | Prosyk | G02F 1/3136 359/237 |
| 2005/0025419 | A1* | 2/2005 | Fish | G02B 6/12004 385/31 |
| 2010/0111466 | A1* | 5/2010 | Doerr | H04B 10/5053 385/2 |
| 2010/0303122 | A1* | 12/2010 | Popovic | G02F 1/011 359/290 |
| 2013/0209021 | A1* | 8/2013 | Hayashi | G02F 1/225 385/2 |
| 2013/0216175 | A1* | 8/2013 | Onishi | G02F 1/225 385/1 |
| 2013/0241756 | A1* | 9/2013 | Sato | G02F 1/0121 341/137 |
| 2013/0301976 | A1* | 11/2013 | Saida | G02B 6/126 385/11 |
| 2013/0315524 | A1* | 11/2013 | Saida | H04B 10/548 385/3 |
| 2014/0036944 | A1* | 2/2014 | Tokuhisa | H01S 3/1003 372/29.015 |
| 2015/0049984 | A1* | 2/2015 | Kato | H04B 10/5561 385/31 |
| 2015/0109661 | A1* | 4/2015 | Li | H01S 5/3013 359/341.4 |
| 2016/0103382 | A1* | 4/2016 | Liboiron-Ladouceur | H04B 10/516 385/3 |
| 2016/0238795 | A1* | 8/2016 | Tan | G02F 1/3138 |
| 2016/0352515 | A1* | 12/2016 | Bunandar | H04L 9/0852 |
| 2017/0026133 | A1* | 1/2017 | Antona | H04B 10/54 |
| 2017/0170908 | A1* | 6/2017 | Sternklar | H04L 27/361 |
| 2018/0031946 | A1* | 2/2018 | Middlebrook | H04B 10/505 |
| 2018/0136400 | A1* | 5/2018 | Wohlfeil | G02B 6/29343 |
| 2018/0173023 | A1* | 6/2018 | Streshinsky | G02F 1/011 |
| 2018/0278456 | A1* | 9/2018 | Sternklar | H04L 27/361 |
| 2018/0331710 | A1* | 11/2018 | Lovberg | H04B 1/40 |
| 2019/0056632 | A1* | 2/2019 | Dutt | G02F 1/313 |
| 2019/0305854 | A1* | 10/2019 | Campos | H04B 10/6164 |
| 2021/0011313 | A1* | 1/2021 | Nahmias | G02F 1/025 |
| 2021/0328683 | A1* | 10/2021 | Peters | H04B 10/5561 |
| 2021/0389244 | A1* | 12/2021 | Bowman | G01N 21/6408 |
| 2022/0021459 | A1* | 1/2022 | Kurczveil | H04B 10/506 |
| 2022/0057641 | A1* | 2/2022 | Hoefler | G02B 27/10 |

OTHER PUBLICATIONS

Mahmound et al, "Lithium NIobate Electro-Optic RAcetrack Modulator Etched in Y-cut LNOI Platfrom", Feb. 2018, IEEE Photonics Journal, vol. 10, No. 1 (Year: 2018).*
Marman et al. "Silicon MIcroring Modulator with a pin-Diode-Loaded Multimode Interferometer Coupler", 2019 (Year: 2019).*
Lv et al, "Polymer-Based Microring Resonator with the Multimode Interference Coupler Operating at Very-Near-Infrared Wavelengths", Jul. 2019, Applied Science, 2019 (Year: 2019).*
Le et al "The Design of the 4×4 Multimode Interference Coupler Based Microring Resonators on an SOI Platform", Feb. 2019, Journal of Telecommunication and Information Technology (Year: 2019).*
PCT/EP2019/069330 International Search Report & Written Opinion (dated Oct. 29, 2019).
Yang et al. "28Gb/s BPSK modulation in a coupling-tuned silicon microring resonator." 2015 Conference On Lasers and Electro-Optics (CLEO), OSA pp. 1-2 (May 10, 2015).

* cited by examiner

PHASE MODULATOR FOR OPTICAL SIGNAL USING MULTIMODE INTERFERENCE COUPLERS

CLAIM OF PRIORITY

This application is the U.S. National Stage of International Patent Application No. PCT/EP2019/069300 filed Jul. 17, 2019, which claims priority to United Kingdom Patent Application No. GB 1811707.7 filed Jul. 17, 2018, both of which applications are incorporated herein by reference in their entirety.

FIELD

The present disclosure relates to a phase modulator and an amplitude modulator.

BACKGROUND

The ever-increasing need for communications has meant that faster and more efficient techniques are required to ensure further increases in bandwidth.

Electrical wired and wireless communications reached a limit decades ago, when using simple on-off keying (OOK). Instead they moved to phase modulation techniques as well as adding parallel channels. Optical communication was able to stay with OOK until recently, but has actively moved toward advanced modulation techniques, especially in long-haul fibre optic communications.

Currently these advanced modulation techniques require the use of phase modulators; especially the ubiquitous Mach Zehnder modulator (MZM). MZMs are relatively large, are typically not very energy efficient and have very different material requirements to a laser, which makes the integration of lasers with MZMs expensive and challenging. In short reach data communications, directly amplitude-modulated lasers such as vertical cavity surface emitting lasers (VCSELs) are significantly less expensive than integrated lasers with MZMs.

A Mach Zehnder modulator (MZM) integrated with a laser require very different semiconductor materials. The problem is to integrate both components together requires complex materials and fabrication, necessitating a custom fabrication facility which increases the cost of the structure.

One possible solution is a modulator made from multiple absorption modulators with a multimode interference (MMI) device, star coupler and phase adjustments sections. Another solution is disclosed in European Patent Publication number EP 2 908 449, assigned to Alcatel Lucent et al. This patent publication describes at least three main multi-mode interferometers set in series and arranged for transforming in combination a received optical signal with an initial phase state into a final optical signal with a final phase state differing from this initial phase state by an accumulated phase shift chosen from a group comprising 0, $\pi/2$, $\pi$, $3\pi/2$ and depends from the intensity modulations carried out by the modulators. An extra phase adjustment is thus required for it to work correctly. However these solutions are not practical to implement due to the number and complexity of the components that results in a large inherent insertion loss.

It is therefore an object of this disclosure to provide a phase modulator system to overcome at least one of the above mentioned problems

SUMMARY

According to a first aspect of the invention there is provided, as set out in the appended claims, an optical system for outputting a modulated signal comprising a single multimode interference (MMI) device having a at least two inputs, and at least one output, wherein the relative phase between the at least two inputs is fixed at a given phase difference such that the output modulated signal is controllable by modulating the input power of at least one of the at least two inputs.

The invention only requires a single MMI device to operate as the relative phase between the two inputs are fixed relative each other and one of the inputs can be used to modulate the output by modulating the power at a single input. In further embodiments, the invention shows how correct phases can be set by a single MMI device. Thus, no more than two MMIs are required in conjunction with phase or amplitude modulating elements to fully generate a BPSK or QPSK signal. The invention provides a further advantage in that significant optical power can be recycled if the modulator is inserted within a laser cavity. This leads to a more efficient transmitter than if this or an equivalent BPSK or QPSK is used following a laser, rather than within the laser. The invention provides a modulator that is compatible with a semiconductor laser. This means that it can be made in a standard commercial fabrication facility using the same epitaxial material required for a laser, and does not require complex fabrication or epitaxial regrowth. With a greatly simplified structure compared to a MZM solution the invention provides significantly higher yield as well as lower cost. The invention is also significantly smaller than the MZM solution.

The invention can either be added to a laser, or incorporated into a laser resonator to provide a low-cost transmitter that can generate phase modulated signal.

The phase modulator can be incorporated within a laser cavity, which solves the insertion loss issue of current solutions. Thus, the device described in this invention can be used to create the advanced modulation signals required for optical communication systems.

In one or more embodiments the phase of the at least two inputs to the MMI is set by a second multimode interference (MMI) device.

In one or more embodiments the phase of the at least two inputs to the MMI is set by coupling the multimode interference device within a resonator.

In one or more embodiments setting the phase comprises applying the phase dependence of a transfer function of the MMI based on a developed phase relationship.

In one or more embodiments the MMIs are coupled together with waveguides of the same or similar length results in the correct phase conditions to make a binary phase shift keying (BPSK) signal from an output waveguide. It is worth noting that while BPSK typically includes two possible states of identical amplitude and different phase, the BPSK modulator described herein allows for different amplitude states, allowing the creation of a pulse amplitude modulation (PAM) signal.

In one or more embodiments the MMIs are coupled together with two connecting arms each biased so that the gain in the arms changes the output from the MMI device and then input into the second MMI device such that the output modulated signal is a BPSK or a quadrature phase shift keying (QPSK) signal. It is worth noting that the QPSK modulator described herein can be used to create higher order quadrature amplitude modulation (QAM) signals.

In one or more embodiments a first connecting arm and second connecting arm form connecting loops $L_1$ and $L_2$; the second MMI device has at least two outputs; and wherein a resonance is created by looping one of the outputs of the second MMI device back into one of the first or second inputs of the MMI device such that the BPSK signal is generated by modulating light through connecting loops $L_1$ and $L_2$.

In one or more embodiments the MMI device comprises three inputs and three outputs, wherein two outputs are looped back to corresponding inputs to form two separate feedback loops and form resonances.

In one or more embodiments the system is configured to alter the bias on the two separate feedback loops and the output from the MMI device can have its phase shifted to create a BPSK signal.

In one or more embodiments the MMIs are coupled together with two or more waveguides wherein the length of each waveguide increases by a fixed length with respect to an adjacent waveguide to create a phase condition to make a BPSK or a QPSK signal from an output waveguide.

In one or more embodiments the MMI device comprises four inputs and four outputs and configured as a high reflectivity mirror wherein two outputs are looped together to form an inner loop and the two outputs are configured to form an outer loop.

In one or more embodiments the power in the inner loop ($L_{in}$) and outer loop ($L_{out}$) are identical, then the mirror will reflect all of the signal back.

In one or more embodiments the power in the inner and outer loops are modulated such that a BPSK signal will be generated on the output waveguide.

In one or more embodiments, the optical system comprises at least four inputs in total, the phase of each of the four inputs being fixed relative to each of the other inputs.

In one or more embodiments the MMI device comprises four outputs and each output is coupled to a corresponding output of the second MMI device.

In one or more embodiments one of the outputs is configured to be looped back as an input to form a lasing cavity.

In one or more embodiments the output modulated signal is at least one of: a BPSK (binary phase shift keying) signal; a QPSK (quadrature phase shift keying) signal; or a higher order PAM (pulse amplitude modulation) or QAM (quadrature amplitude modulation) signal.

According to a second aspect of the present invention, there is provided a method of outputting an optical modulated signal comprising the steps of: providing a multimode interference (MMI device) having at least two inputs and at least one output; providing a first input signal to a first one of the at least two inputs, and a second input signal to a second one of the at least two input signals wherein the relative phase between the at least two input signals is fixed at a given phase difference such that with a fixed phase; modulating the input power of at least one of the first and second inputs; to produce a modulated signal at the at least one output of the MMI.

In another embodiment there is provided an optical system for outputting a modulated signal comprising a multimode interference (MMI) device having at least two inputs configured with a fixed phase and an output, wherein the output modulated signal is controlled by modulating the input power of at least one of the inputs.

There is also provided a computer program comprising program instructions for causing a computer program to carry out the above method which may be embodied on a record medium, carrier signal or read-only memory.

Each of the optional features discussed above could apply equally to the first and second aspects of the present invention.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The invention provides a N×M multimode interference couplers (MMI), where N>1. The invention can be used to create phase modulated signals, by setting the phase of the N input signals to the MMI and then modulating the input power to the N MMI inputs. The correct input phases can be set using a number methods including using a second MMI, or by incorporating the MMI into a resonator, as described in more detail below with respect to the various embodiments.

The invention provides a system and method for creating a phase shift keying signal (PSK with outputs varying by 180°), a quadrature phase shift keying signal (QPSK with outputs varying by 90°), or alternate modulation with other angles (e.g. 60°). Adding a pulse amplitude modulation (PAM) signal to the QPSK device will lead to a quadrature amplitude modulated signal (QAM).

A single multimode interference device (MMI) can be used to create advanced coherent modulation signals, such as BPSK (binary phase shift keying), QPSK (quadrature phase shift keying), and higher order QAM (quadrature amplitude modulation). This is achieved by exploiting the phase dependence of the transfer function of the MMI based on developed phase relationships to enable the invention.

Figure 1:
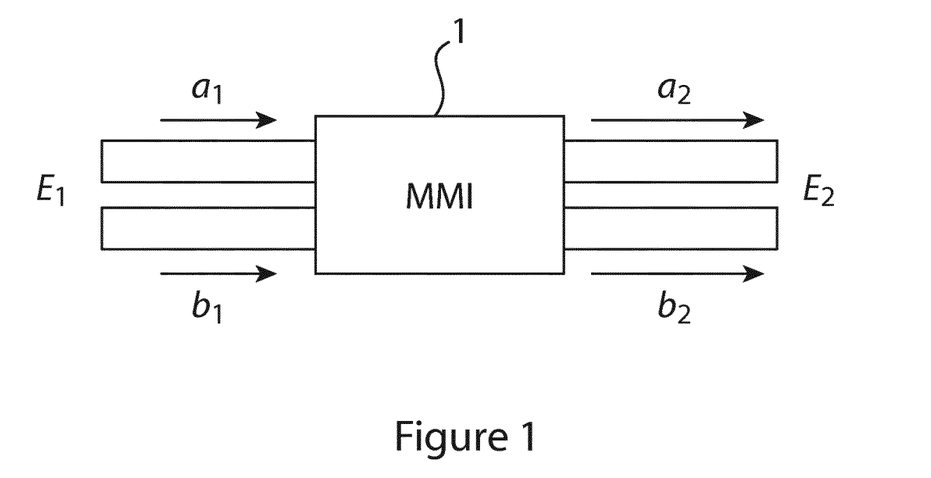
FIG. 1 illustrates a 2×2 Multimode Interference (MMI) device and the generation of a BPSK signal.

To best explain the fundamental idea, consider a 2×2 MMI and the generation of a BPSK signal, as illustrated in FIG. 1 indicated generally be the reference numeral 1. The common factors in the transfer function can be ignored to explain the principle, thus only the 2×2 matrix is required for the explanation (equation 1):

$$M_{2\times 2} = e^{\frac{i2\pi L_{MMI}}{\lambda}} \frac{e^{\frac{i\pi}{2}}}{\sqrt{2}} \begin{bmatrix} 1 & e^{\frac{i\pi}{2}} \\ e^{\frac{i\pi}{2}} & 1 \end{bmatrix} \rightarrow M'_{2\times 2} = \begin{bmatrix} 1 & e^{\frac{i\pi}{2}} \\ e^{\frac{i\pi}{2}} & 1 \end{bmatrix} \quad (1)$$

The output of the MMI ($E_2$) can be calculated from the input to the MMI ($E_1$) using the equation 2:

$$E_2 = M'_{2\times 2} E_1 \rightarrow \begin{bmatrix} a_2 \\ b_2 \end{bmatrix} = \begin{bmatrix} 1 & e^{\frac{i\pi}{2}} \\ e^{\frac{i\pi}{2}} & 1 \end{bmatrix} \begin{bmatrix} a_1 \\ b_1 \end{bmatrix} = \begin{bmatrix} a_1 + b_1 e^{\frac{i\pi}{2}} \\ a_1 e^{\frac{i\pi}{2}} + b_1 \end{bmatrix} \quad (2)$$

If one considers the first output waveguide $$a_2 = a_1 + b_1 e^{i\frac{\pi}{2}},$$

modulating the input values $a_1$ and $b_1$ will lead to a binary phase shift keyed (BPSK) output provided that the phase of the input $b_1$ is 90° shifted from $a_1$. For example:

$$a_1 = |a_1|, \ b_1 = |b_1|e^{i\frac{\pi}{2}} \quad (3)$$
$$a_2 = |a_1| + |b_1|e^{i\pi} = |a_1| - |b_1|$$

Thus, if the inputs $a_1$ and $b_1$ are modulated, the Electric field of the output signal will have a positive value if $|a_1|>|b_1|$, and a negative value (representing a 180° phase shift) if $|a_1|<|b_1|$.

Similarly, if the input $b_1$ is −90° shifted from $a_1$, then a BPSK signal can be generated from the output $b_2$.

Figure 2:
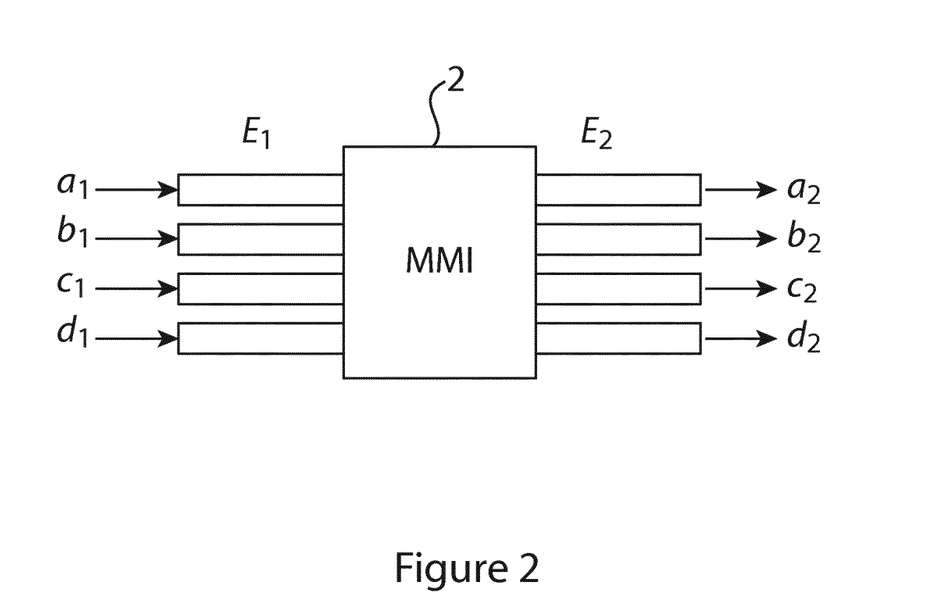
FIG. 2 illustrates a 4×4 Multimode Interference (MMI) device and the generation of a QPSK signal.

FIG. 2 illustrates a 4×4 Multimode Interference (MMI) device and the generation of a QPSK signal indicated by the reference numeral 2. To generate signals in quadrature (i.e. QPSK signals) more than two inputs are required. Thus, consider the 4×4 MMI in FIG. 2. The reduced transfer function for this MMI is given in equation 4 below:

$$M'_{4\times 4} \begin{bmatrix} e^{\frac{i\pi}{4}} & -1 & 1 & e^{\frac{i\pi}{4}} \\ -1 & e^{\frac{i\pi}{4}} & e^{\frac{i\pi}{4}} & 1 \\ 1 & e^{\frac{i\pi}{4}} & e^{\frac{i\pi}{4}} & -1 \\ e^{\frac{i\pi}{4}} & 1 & -1 & e^{\frac{i\pi}{4}} \end{bmatrix} \quad (4)$$

Thus, the signal in the output waveguides can be calculated from equation 5:

$$\begin{bmatrix} a_2 \\ b_2 \\ c_2 \\ d_2 \end{bmatrix} = \begin{bmatrix} e^{\frac{i\pi}{4}} & -1 & 1 & e^{\frac{i\pi}{4}} \\ -1 & e^{\frac{i\pi}{4}} & e^{\frac{i\pi}{4}} & 1 \\ 1 & e^{\frac{i\pi}{4}} & e^{\frac{i\pi}{4}} & -1 \\ e^{\frac{i\pi}{4}} & 1 & -1 & e^{\frac{i\pi}{4}} \end{bmatrix} \begin{bmatrix} a_2 \\ b_2 \\ c_2 \\ d_2 \end{bmatrix} = \begin{bmatrix} a_1 e^{\frac{i\pi}{4}} - b_1 + c_1 + d_1 e^{\frac{i\pi}{4}} \\ -a_1 + b_1 e^{\frac{i\pi}{4}} + c_1 e^{\frac{i\pi}{4}} + d_1 \\ a_1 - b_1 e^{\frac{i\pi}{4}} + c_1 e^{\frac{i\pi}{4}} - d_1 \\ a_1 e^{\frac{i\pi}{4}} + b_1 - c_1 + d_1 e^{\frac{i\pi}{4}} \end{bmatrix} \quad (5)$$

A quadrature phase shift keyed (QPSK) signal can be generated for any of the outputs provide that the input signals have the appropriate phases. For example, using the first output $a_2=a_1 e^{i\pi/4}-b_1+c_1+d_1 e^{i\pi/4}$, a QPSK signal can be generated if the following phase relationships exist between the input fields:

$$a_1 = |a_1|e^{\frac{i\pi}{4}}, \ b_1 = |b_1|, \ c_1 = |c_1|, \ d_1 = -|d_1|e^{\frac{i\pi}{4}} \quad (6)$$
$$a_2 = |a_1|e^{\frac{i\pi}{2}} - |b_1| + |c_1| - |d_1|e^{\frac{i\pi}{2}} - (|c_1|-|b_1|) + (|a_1|-|d_1|)e^{\frac{i\pi}{2}}$$

The in-phase portion of the output signal is generated by modulating the inputs $b_1$ and $c_1$, while the quadrature portion of the output signal is generated by modulating the inputs $a_1$ and $d_1$. A QPSK signal can be generated on each of the output waveguides provided the correct input phases are set. Higher order QAM signals can then be generate by using more than two modulation levels on the input signals.

In general, any N×M MMI can be used to create BPSK, QPSK or QAM signals using this method, provided the correct phases of the input signals are used. The two examples above demonstrate the physics of operation.

The phase condition can be set using an additional MMI, or by connecting the MMI within a resonator. The following provide several embodiments of the invention, where the correct phases are created within a device.

Embodiment 1: A BPSK Modulated Laser Resonator Based on Two 2×2 MMIs

Figure 3:
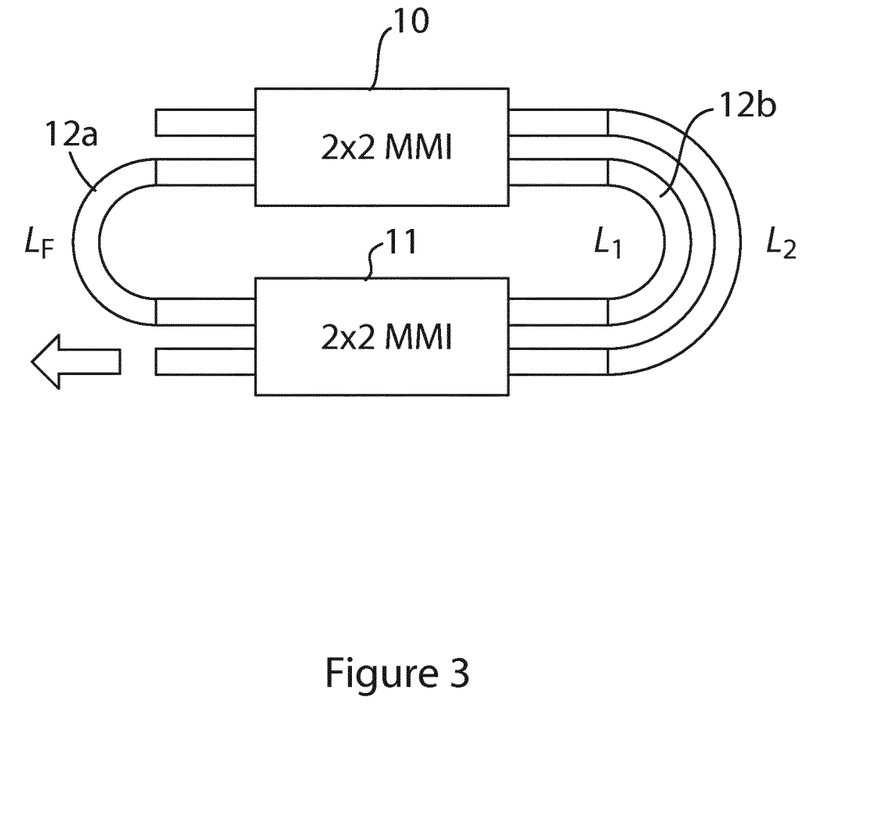
FIG. 3 illustrates a BPSK modulated laser resonator based on two 2×2 MMIs according to one embodiment.

FIG. 3 illustrates how two 2×2 MMIs 10, 11, can be coupled together and two connecting arms biased so that the gain in the arms changes the light output from the first MMI 10 and then input into the second MMI 11 so that the resulting output is BPSK. A resonance is created by looping one of the outputs 12a of the second MMI 11 back into one of the inputs of the first MMI 10. The BPSK signal is generated by modulating the light through the connecting loops 12b shown as $L_1$ and $L_2$.

Embodiment 2: A BPSK Modulated Laser Resonator Based on a 3×3 MMIs

Figure 4:
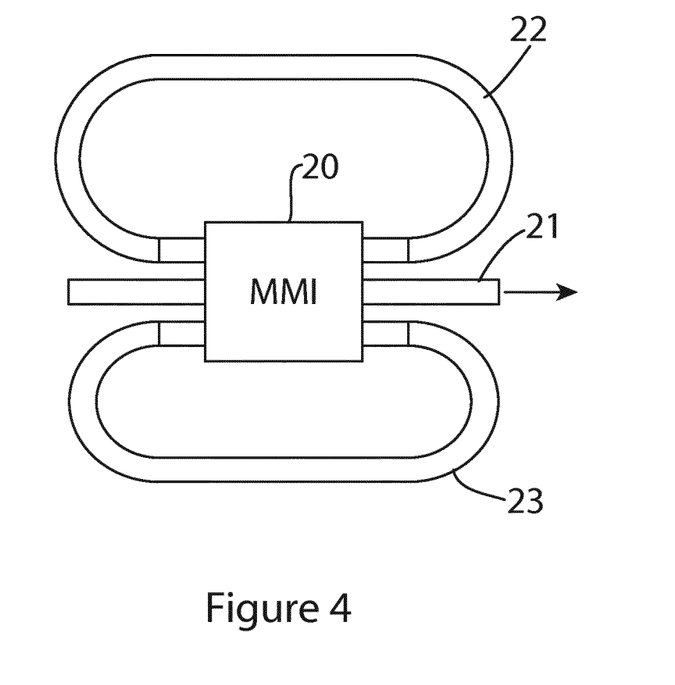
FIG. 4 illustrates a BPSK modulated laser resonator based on a 3×3 MMIs according to one embodiment.

FIG. 4 illustrates a 3×3 MMI configuration, based on a mirrored symmetric 1×2 MMI indicated by the reference numeral 20. The MMI 20 can can have its non-central ports 22 and 23 looped together to form resonances. The central port 21 can be used as an output. By altering the bias on the loop arms 22, 23 the output from the MMI 21 can have its phase shifted to create a BPSK signal.

Embodiment 3: A BPSK Mirror Based on a 4×4 MMI Loop

Figure 5:
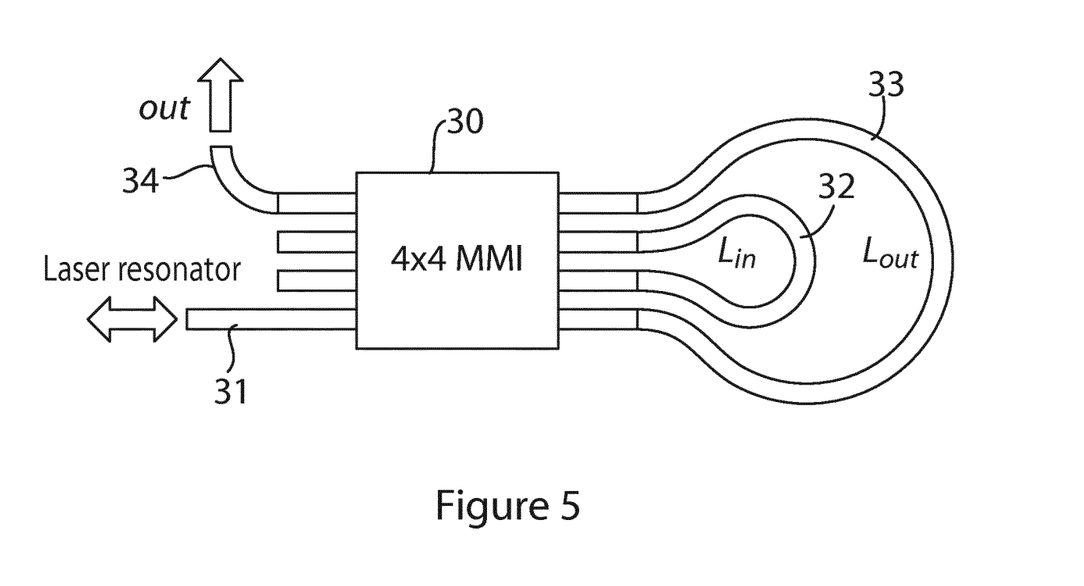
FIG. 5 illustrates a single 4×4 MMI configured into a high reflectivity mirror.

FIG. 5 illustrates a single 4×4 MMI 30 that can be configured into a high reflectivity mirror having a laser resonator driven input 31. If the power in the inner loop 32 ($L_{in}$) and outer loop 33 ($L_{out}$) are identical, then the mirror will reflect all of the light back (ignoring waveguide and MMI losses, etc.). If the power in the inner and outer loops are modulated, a BPSK signal will be generated on an output waveguide 34.

Embodiment 4: a QPSK Modulator

Figure 6:
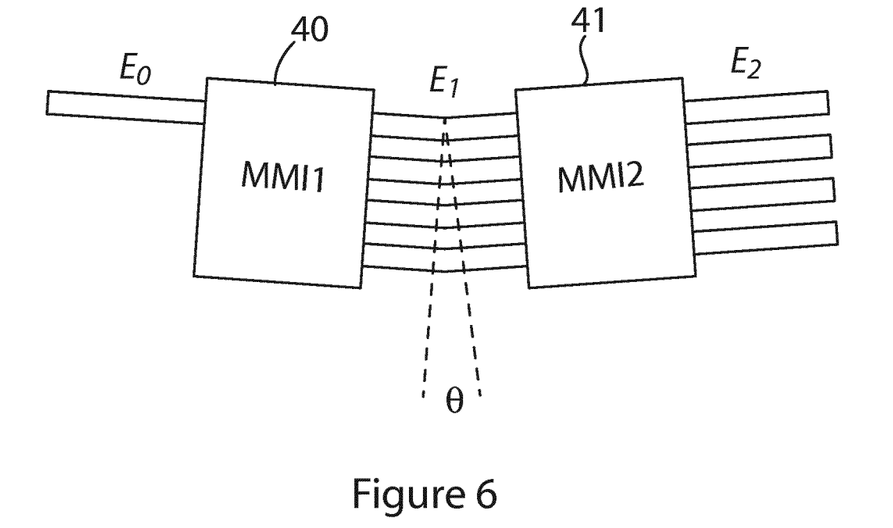
FIG. 6 illustrates two 4×4 MMIs coupled together with waveguides of increasing length to provide a QPSK modulator.

FIG. 6 illustrates two 4×4 MMIs 40, 41 coupled together with waveguides of increasing length positioned at the output (E1) of the MMI 40. The correct phase conditions can be made if each waveguide has an additional phase change of 180 degrees or PI radians. Then, a QPSK signal is output from the top or bottom waveguides. The signal can be generated by modulating the connecting straight waveguides on one or more the output of the MMI 41.

Embodiment 5: A QPSK Modulated Laser Resonator Based on Two 4×4 MMIs

Figure 7:
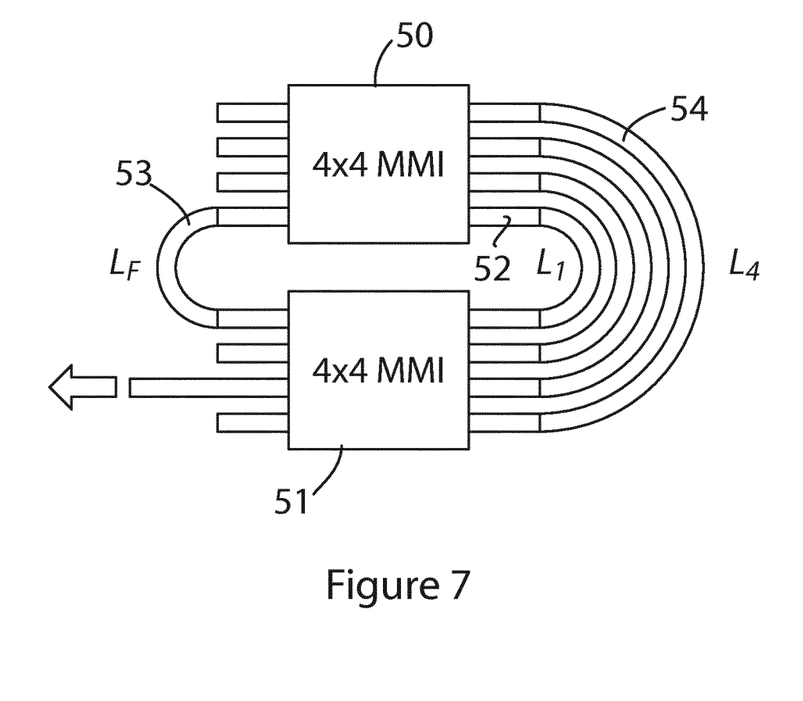
FIG. 7 illustrates a QPSK modulated laser resonator based on two 4×4 MMIs according to another embodiment of invention.

FIG. 7 illustrates a 4×4 MMI configured to have a plurality of outputs looped 52, 54 back together to create an effective two coupled 4×4 MMIs 50 and 51. One of the outputs 53 can then be looped back as an input to create a lasing cavity. Another output can then be used as the signal output. As the bias on the arms is altered a QPSK signal can be created.

Embodiment 6: Chirp Free Directly Modulated Laser Output Embodiment

Directly modulated lasers have one significant weakness, which is frequency chirp. When the laser is turned off and on, the change in the carrier density in the active cavity leads to a change in the index of refraction and thus changes in the frequency of the laser output, which is not desired but rather limits the use of these lasers.

This invention provides a solution to laser chirp. FIGS. 3, 4 and 7 are based on laser resonators. If the modulated loop lengths ($L_1 \rightarrow L_4$) are modulated in a push-pull manner, then the total power in the resonator portion of the laser is constant and frequency chirp can be eliminated. For example, in FIG. 4 if the BPSK state is described by equation 3, where $a_1$ and $b_1$ now represent the power at the output MMI from the loops $L_1$ and $L_2$, then the two BPSK outputs would be given by equation 7:

$$a_2(0) = |a_1(0)| - |b_1(0)|$$
$$a_2(1) = |a_1(1)| - |b_1(1)| \quad (7)$$

While the power continuing through the resonator would be:

$$b_2(0) = |a_1(0)| + |b_1(0)|$$
$$b_2(1) = |a_1(1)| + |b_1(1)| \quad (8)$$

If the power in the resonator is constant, then: $b_2(0) = b_2(1)$. And modulation of $a_1$ and $b_1$ that creates this condition will eliminate chirp in the resonator. The simplest solution is to set:

$$|a_1(0)| = |b_1(1)|, |a_1(1)| = |b_1(0)| \quad (9)$$

This is push-pull modulation, since both signals are modulated.

It will be appreciated if chirp free modulation is not required, only one channel needs to be modulated for a BPSK signal, and only two channels for a QPSK signal. The power of one of the input waveguides can then be held constant.

The invention also provides accurate phase modulation, equivalent to a MZM. The fundamental properties of the MMIs, described by their transfer function necessitates accurate phase outputs. For example, considering embodiment 1, the first MMI precisely sets the correct phases for the second MMI. Then, the second MMI ensures that the output will have phases offset by 180 degree as required for a BPSK signal.

It will be appreciated that the solution of the invention provides a compact physically small solution compared to the prior art. A typical III-V semiconductor based MZM is made using two 2×2 MMI joined by phase adjustment arms. These phase adjustment arms must be typically 1-2 mm long to generate the required phase changes for MZM operation. In comparison the simple BPSK modulator described in embodiment 1 above, uses very short absorption modulator arms to join the two MMIs. These short arms are typically 0.05-0.2 mm long. With 2×2 MMI on the order of 0.3 mm long, this means that a typical semiconductor based MZM will be 1.6-2.6 mm long, while the BPSK modulator described in embodiment 1 will be 0.65-0.8 mm long, i.e. 25-50% of the size of the MZM. In silicon the size advantage of the invention is more significant, as MZM phase adjustment arms in silicon are much longer than in III-V materials, and MMIs are typically significantly shorter.

The embodiments described herein could be fabricated from any suitable waveguide material. For example, the waveguides could be fabricated in silicon or silica. The waveguide may be a buried or a non-buried waveguide. Where a waveguide in the device serves to introduce power modulation into the system, it must be capable (along at least some of its length) of amplitude modulation. This amplitude modulation could take the form of electrical or optical absorption and could arise from any suitable effect known in the art (e.g. Stark effect, Franz Keldysh effect, Quantum Well/quantum dots).

The embodiments in the invention described with reference to the drawings comprise a computer apparatus and/or processes performed in a computer apparatus to control the operation of the optical modulator. The invention also extends to computer programs, particularly computer programs stored on or in a carrier adapted to bring the invention into practice such as controlling the optical modulator operation. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An optical system for outputting a modulated signal, the optical system comprising a first multimode interference (MMI) device having at least two inputs, and at least one output,
    wherein relative phase between the at least two inputs is fixed at a given phase difference,
    wherein the output modulated signal is produced by modulating the input power of at least one of the at least two inputs, and
    wherein the given phase difference is set by coupling the first MMI device within a resonator.

2. The optical system of claim 1 wherein the given phase difference between the at least two inputs to the first MMI device is by configured using a second MMI device.

3. The optical system of claim 1 wherein setting the given phase difference comprises applying the phase dependence of a transfer function of the first MMI device based on a developed phase relationship.

4. The optical system of claim 2 wherein the first MMI device and the second MMI device are coupled together with waveguides having substantially the same length to obtain phase conditions which generate a BPSK signal.

5. The optical system of claim 2 wherein with the at least one output of the first MMI device is coupled to an input of the second MMI device and an output of the second MMI device is coupled to a first one of the at least two inputs using two connecting arms, each connecting arm being biased so that the gain in the arms changes the at least one output of the first MMI device such that the output modulated signal is a BPSK or a QPSK signal.

6. The optical system of claim 5, wherein:
each of the connecting arms forms a respective loop $L_1$ and $L_2$;
the second MMI device has at least two outputs; and
a resonance is created by looping one of the outputs of the second MMI device back into a second one of the at least two inputs of the first MMI device such that the BPSK signal is generated by modulating light through connecting loops $L_1$ and $L_2$.

7. The optical system of claim 2 wherein the at least one output of the first MMI device is coupled to an input of the second MMI device and an output of the second MMI device is coupled to a first one of the at least two inputs using two or more waveguides wherein the length of each waveguide increases by a fixed length with respect to an adjacent waveguide to create a phase condition to make a BPSK or a QPSK signal from an output waveguide.

8. The optical system of claim 2 wherein the first MMI device comprises four outputs and each output is coupled to a corresponding input of the second MMI device.

9. The optical system of claim 1 wherein one of the at least two inputs is configured to be looped back as one of the at least two inputs to form a lasing cavity.

10. The optical system of claim 1 wherein the output modulated signal is at least one of: a BPSK (binary phase shift keying) signal; a QPSK (quadrature phase shift keying) signal; or a higher order QAM (quadrature amplitude modulation) signal.

11. A method of outputting an optical modulated signal comprising the steps of:

providing a multimode interference (MMI device) having at least two inputs and at least one output;
providing a first input signal to a first one of the at least two inputs, and a second input signal to a second one of the at least two inputs
configuring a phase difference between the first input signal and the second input signal by coupling the MIMI device within a resonator, wherein relative phase between the first input signal and the second input signal is fixed; and
modulating the input power of at least one of the at least two inputs to produce a modulated signal at the at least one output of the MMI.

12. A computer program comprising program instructions for causing a computer to control the method of claim 11.

13. An optical resonator configured to output a modulated signal, the optical resonator comprising:
a first multimode interference (MMI) device having at least two inputs;
a second MMI device having at least one input coupled to an output of the first MMI device,
wherein relative phase between the at least two inputs of the first MMI device is fixed by a phase difference configured using the second MMI device, and
wherein input power of one of the at least two inputs of the first MMI device is modulated to produce a modulated signal at the output of the first MMI.

\* \* \* \* \*